(12) United States Patent
Hongal et al.

(10) Patent No.: US 7,733,856 B2
(45) Date of Patent: Jun. 8, 2010

(54) OBTAINING PATH INFORMATION RELATED TO A VIRTUAL PRIVATE LAN SERVICES (VPLS) BASED NETWORK

(75) Inventors: Thippanna Hongal, San Jose, CA (US); Prashanth Ishwar, Santa Clara, CA (US); Rahul S. Kasralikar, San Jose, CA (US); John Rigby, Reading (GB); Krishna Sankaran, Sunnyvale, CA (US); Ramanaravanan Ramakrishnan, San Jose, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1134 days.

(21) Appl. No.: 10/891,546

(22) Filed: Jul. 15, 2004

(65) Prior Publication Data
US 2006/0013142 A1    Jan. 19, 2006

(51) Int. Cl.
*H04L 12/56* (2006.01)
(52) U.S. Cl. .................................. 370/389; 370/236
(58) Field of Classification Search .................. 370/389, 370/390, 392, 236, 230, 352, 335, 406, 412; 709/223; 725/112; 713/201
See application file for complete search history.

(56) References Cited

U.S. PATENT DOCUMENTS

| | | | |
|---|---|---|---|
| 6,473,403 B1* | 10/2002 | Bare | 370/236 |
| 6,538,997 B1 | 3/2003 | Wang et al. | |
| 2001/0022786 A1* | 9/2001 | King et al. | 370/412 |
| 2003/0174706 A1* | 9/2003 | Shankar et al. | 370/393 |
| 2003/0189898 A1 | 10/2003 | Frick et al. | |
| 2004/0037279 A1 | 2/2004 | Zelig et al. | |
| 2004/0109443 A1* | 6/2004 | Gai et al. | 370/389 |
| 2004/0151180 A1* | 8/2004 | Hu et al. | 370/392 |
| 2004/0184408 A1* | 9/2004 | Liu et al. | 370/236 |
| 2005/0018605 A1* | 1/2005 | Foote et al. | 370/230 |
| 2005/0125692 A1* | 6/2005 | Cox et al. | 713/201 |
| 2005/0169270 A1* | 8/2005 | Mutou et al. | 370/390 |
| 2005/0190757 A1* | 9/2005 | Sajassi | 370/389 |
| 2005/0243815 A1* | 11/2005 | Nguyen et al. | 370/389 |
| 2006/0002408 A1* | 1/2006 | Ould-Brahim | 370/406 |
| 2006/0080421 A1* | 4/2006 | Hu | 709/223 |

(Continued)

OTHER PUBLICATIONS

Lasserre, Mark, "Virtual Private LAN Services over MPLS", IETF draft-lasserre-vkompella-ppvpn-vpls-04.txt, Mar. 2003.

(Continued)

*Primary Examiner*—Kwang B Yao
*Assistant Examiner*—Syed Bokhari
(74) *Attorney, Agent, or Firm*—Wilson & Ham (57) ABSTRACT

Path information is obtained in a VPLS-based network by generating special Layer 2 frames (referred to herein as "trace-request frames"), performing source MAC filtering to identify the trace-request frames, and generating a special frame (referred to herein as a "trace-reply frame") when the source MAC filtering identifies a trace-request frame. Upon identifying a trace-request frame, path information is collected and embedded into the trace-reply frame. The trace-reply frame is then sent to the originating node where the path information is used to learn the path that the trace-request frame traversed. By sending multiple trace-request frames with different source MAC addresses, path information received from source MAC filtering at different nodes in the VPLS-based network can be collected and used to learn an entire path of interest.

29 Claims, 8 Drawing Sheets

U.S. PATENT DOCUMENTS

2007/0083907 A1* 4/2007 Serbest et al. ............... 725/112

OTHER PUBLICATIONS

Kompella, K. "Virtual Private LAN Service", IETF draft-kompella-ppvpn-vpls-02.txt, May 2003.

Martini, Luca "Transport of Layer 2 Frames Over MPLS", IETF draft-martini-l2circuit-trans-mpls-09.txt, Apr. 2003.

Martini, Luca "Encapsulation Methods for Transport of Layer 2 Frames Over IP and MPLS Networks", IETF draft-martini-l2circuit-encap-mpls-04.txt, Nov. 2001.

Stokes, Olen, "Testing Hierarchical Virtual Private LAN Services", IETF draft-stokes-vkompella-ppvpn-hvpls-oam-02.txt, Jun. 2003.

* cited by examiner

OBTAINING PATH INFORMATION RELATED TO A VIRTUAL PRIVATE LAN SERVICES (VPLS) BASED NETWORK

FIELD OF THE INVENTION

The invention relates generally to network management, and more particularly, to a technique for obtaining path information related to a virtual private local area network (LAN) services (VPLS) based network.

BACKGROUND OF THE INVENTION

Virtual private LAN services (VPLS) over MPLS provides LAN-like connectivity between geographically diverse customer locations. Draft standards for implementing VPLS over MPLS are presented in "Virtual Private LAN Services over MPLS", IETF draft-lasserre-vkompella-ppvpn-vpls-04.txt, March 2003, and "Virtual Private LAN Service", IETF draft-kompella-ppvpn-vpls-02.txt, May 2003, "Transport of Layer 2 Frames over MPLS", IETF draft-martini-12circuit-trans-mpls-09.txt, April 2002, and "Encapsulation Methods for Transport of Layer 2 Frames Over IP and MPLS networks", IETF draft-martini-12circuit-encap-mpls-04.txt, November 2001, all of which are incorporated by reference herein.

Figure 1:
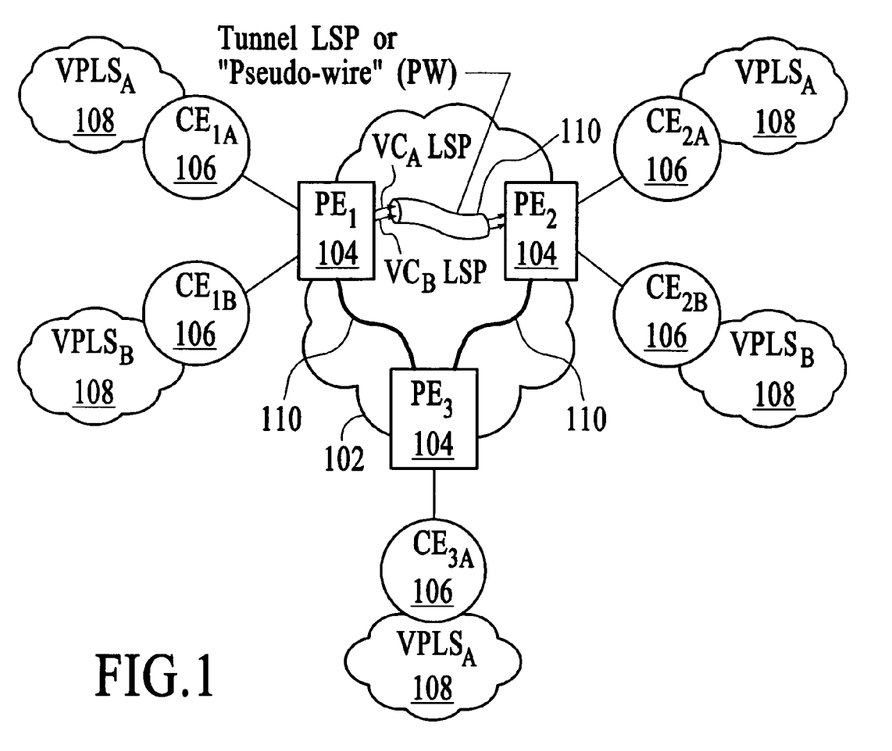
FIG. 1 depicts a VPLS-based network as known in the prior art with geographically diverse customer edge devices (CEs), and customer LANs for two different customers, customer A and customer B.
Figure 2:
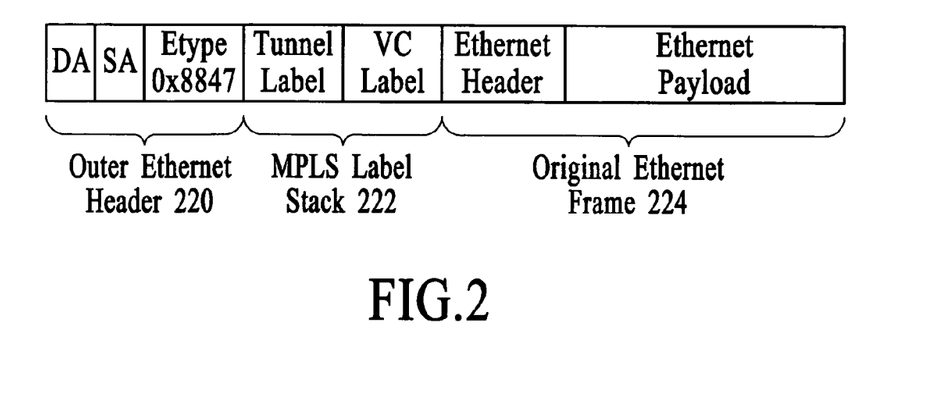
FIG. 2 depicts an example of a known frame encapsulation format for implementing VPLS.

The basic operation of VPLS is described with reference to FIG. 1 and involves establishing virtual circuit (VC) label switching paths (LSPs) and tunnel LSPs (also referred to as "pseudo-wires"). FIG. 1 depicts an MPLS domain 102, three service provider edge devices (PEs) 104, geographically diverse customer edge devices (CEs) 106, and customer LANs 108 for two different customers, customer A and customer B. FIG. 1 also depicts corresponding tunnel LSPs 110 between the PEs and examples of VC LSPs (e.g., $VC_A$ LSP and $VC_B$ LSP) that are carried within the tunnel LSPs. In operation, an Ethernet frame from a customer location is either switched or routed by a CE to one of the PEs (also known as MPLS label edge router (LERs)). The respective PE classifies the frame based on either the incoming port or the virtual local area network (VLAN) identifier (ID) of an IEEE 802.1q tagged frame. The frame is then mapped to a user-defined Forwarding Equivalence Class (FEC), which specifies how the frame gets forwarded. The FEC lookup yields the outgoing port of the frame and the tunnel and VC labels that are used to encapsulate the frame. FIG. 2 depicts an example of a frame encapsulation format for implementing VPLS. A complete description of the frame format is described in the above-referenced IETF document entitled "Encapsulation Methods for Transport of Layer 2 Frames Over IP and MPLS networks." The frame format includes the original Ethernet frame 220, an MPLS label stack 222, and an outer Ethernet header 224. The outer Ethernet header identifies the next hop of the frame during transport through the MPLS domain. The label at the top of the MPLS label stack is the tunnel label, which is used to transport the frame across the provider's MPLS domain via the tunnel LSPs. The label at the bottom of the MPLS label stack is the VC label, which is used by egress PEs to determine how to process a frame that is exiting the MPLS domain. The original Ethernet frame is the customer frame that is transported between the geographically diverse customer locations.

During transport through the MPLS domain 102, backbone label switch routers (LSRs) (not shown) in the MPLS domain only look at a frame's tunnel label to switch the frame through the MPLS domain. The tunnel label at the top of the MPLS label stack is removed at the penultimate hop (i.e., the hop prior to the egress PE) and the frame is passed to the egress PE with only the VC label. The egress PE uses the VC label to determine how to process the frame. The frame is then forwarded to the outgoing port that is identified via the VC label.

Figure 3:
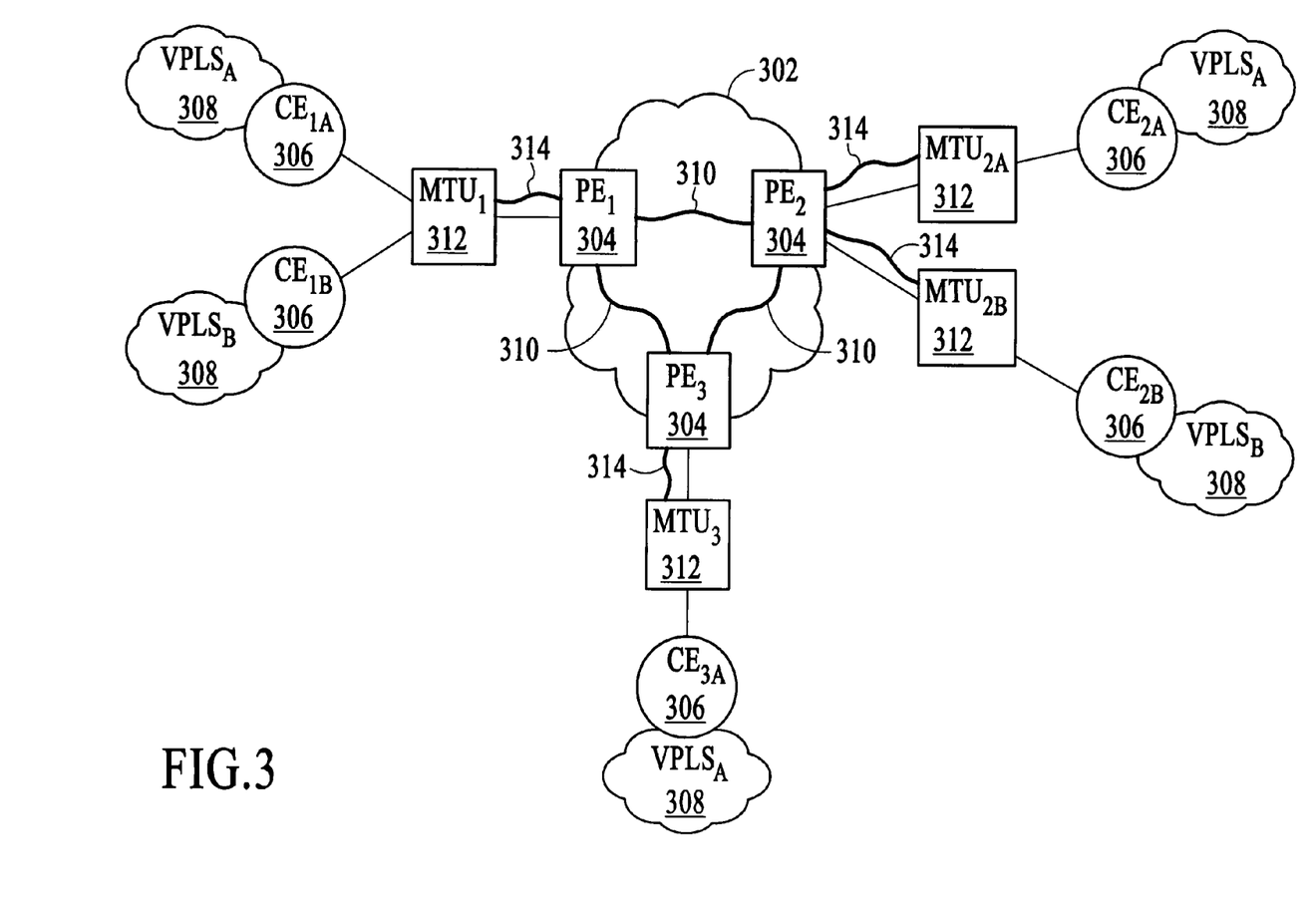
FIG. 3 depicts an example of an HVPLS-based network architecture as known in the prior art, which includes Layer 2 MTUs located between the PEs and the CEs to create hierarchies with a hub-and-spoke arrangement.

The VPLS architecture described above with reference to FIG. 1 can be modified to improve scalability. A standardized architecture for improved scalability is referred to in the above-described documents as Hierarchical VPLS or "HVPLS." FIG. 3 depicts an example of an HVPLS-based network architecture, which includes Layer 2 devices, referred to as multi-tenant units (MTUS) 312, located between the PEs 304 and the CEs 306 to create hierarchies with a hub-and-spoke arrangement. Using the HVPLS architecture, a full mesh of tunnels 310 is maintained between the PEs within the MPLS domain while additional LSPs 314 are established between the PEs 304 and MTUs 312. The hierarchical architecture reduces signaling and frame replication overhead and as a result large scale VPLS services are easier to deploy.

To provide viable VPLS services, a service provider must be able to test the connectivity between nodes in its VPLS-based network. In particular, it is important to be able to test the paths that are traveled by actual customer traffic. Two categories of testing functionality that are common in network management involve testing end-to-end connectivity between two nodes (often referred to as a "ping" test) and learning the path that traffic travels to get from one node to another (often referred to as a "traceroute" or "tracepath" test). Well-known "ping" and "traceroute" functionality has been developed for Layer 3 networks (e.g., IP-based networks). Although the ping and traceroute functions work well in IP-based networks, these functions are not exactly transferable to Layer 2 networks such as VPLS-based networks. Solutions for providing Layer 2 ping functionality have been implemented and accepted however there is no widely accepted technique for providing the traceroute functionality. One proposed solution for providing traceroute functionality is described by Stokes et al. in an IETF draft document entitled "Testing Hierarchical Virtual Private LAN Services" (draft-stokes-vkompella-ppvpn-hvpls-oam-02.txt), June 2003. This proposal for providing traceroute functionality in a VPLS-based network depends on retaining the value in the time-to-live (TTL) field of the MPLS tunnel label when the tunnel LSP is switched at a PE. Retaining the TTL value in the tunnel label through an LSP switch can be difficult to implement because it requires additional information to be switched from an ingress port to an egress port.

In view of this, what is needed is a technique for obtaining path information related to a VPLS-based network that is easy to implement and that reflects paths that are traveled by actual customer traffic.

SUMMARY OF THE INVENTION

In accordance with the invention, path information is obtained in a VPLS-based network by generating special Layer 2 (L2) frames (referred to herein as "trace-request frames"), performing source MAC filtering to identify the trace-request frames, and generating a special frame (referred to herein as a "trace-reply frame") when the source MAC filtering identifies a trace-request frame. Upon identifying a trace-request frame, path information is collected and embedded into the trace-reply frame. The trace-reply frame is then sent to the originating node where the path information is used to learn the path that the trace-request frame traversed. By sending multiple trace-request frames with different source MAC addresses, path information received from source MAC filtering at different nodes in the VPLS-based network can be collected and used to learn an entire path of interest.

Although multiple trace-request frames are generated with different source MAC addresses, all of the trace-request frames have their destination MAC address set to the same customer MAC address. Because the destination MAC addresses of the trace-request frames are the same, the trace request frames follow the same path until a source MAC address match is identified. Additionally, because the destination MAC addresses are set to a customer MAC address, the path taken by the trace-request frames mimics the path that is taken by customer traffic.

Other aspects and advantages of the present invention will become apparent from the following detailed description, taken in conjunction with the accompanying drawings, illustrating by way of example the principles of the invention.

BREIF DESCRIPTION OF THE DRAWINGS

Throughout the description, similar reference numbers may be used to identify similar elements.

DETAILED DESCRIPTION OF THE INVENTION

Figure 4:
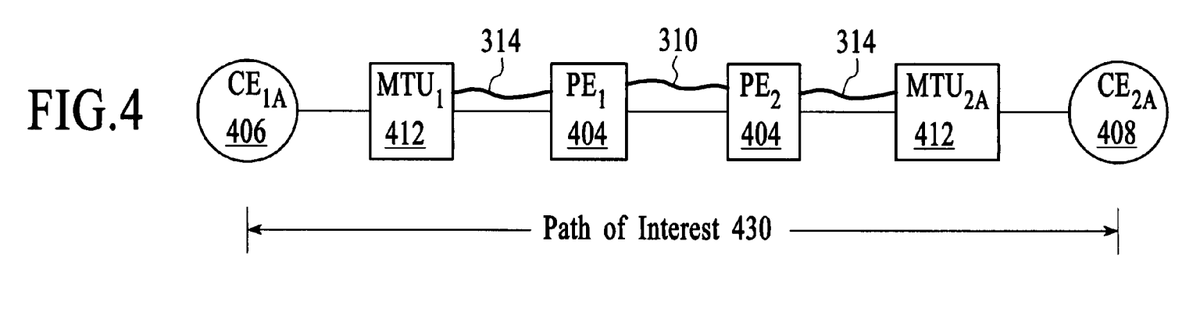
FIG. 4 depicts a portion of the VPLS-based network described with reference to FIG. 3.

FIG. 4 depicts a portion of the VPLS-based network described with reference to FIG. 3. The portion of the VPLS-based network represents a path between two customer edge devices 406 ($CE_{1A}$ and $CE_{2A}$) that utilizes the HVPLS-based architecture. The path includes $MTU_1$, $PE_1$, $PE_2$, and $MTU_{2A}$. As described above, HVPLS utilizes LSPs 310 and 314 to traverse the hops between the MTUs and PEs. To implement a VPLS service over this HVPLS-based architecture, it is desirable to be able to obtain path information related to the path that a customer's VPLS traffic takes between the customer edge devices. In the example of FIG. 4, the path of interest 430 spans the path between $CE_{1A}$ and $CE_{2A}$.

In accordance with the invention, path information is obtained in a VPLS-based network by generating special Layer 2 (L2) frames (referred to herein as "trace-request frames"), performing source MAC filtering to identify the trace-request frames, and generating a special frame (referred to herein as a "trace-reply frame") when the source MAC filtering identifies a trace-request frame. Upon identifying a trace-request frame, path information is collected and embedded into the trace-reply frame. The trace-reply frame is then sent to the originating node where the path information is used to learn the path that the trace-request frame traversed. By sending multiple trace-request frames with different source MAC addresses, path information received as a result of the source MAC filtering at different nodes in the VPLS-based network can be collected and used to learn an entire path of interest.

The technique for obtaining path information related to a VPLS-based network can be implemented between any two service-aware nodes in a VPLS-based network. Throughout the description, a service-aware node is a node at which the original Ethernet frame is used by the node to forward the frame. That is, a service-aware node is a node within a VPLS-based network that looks at the header of the original Ethernet frame to make a forwarding decision instead of just looking at the MPLS label of the encapsulated frame. For example, MTUs and PEs are service-aware nodes because at each node an LSP (i.e., a pseudo-wire) is either started or terminated and the original Ethernet frame is looked at by the node to make a forwarding decision. Service-aware nodes are also referred to in the field as "pseudo-wire switching nodes." In contrast, intermediate nodes (not shown in FIGS. 1, 3, or 4) that exist between the PEs or between a PE and an MTU forward frames based on the MPLS labels (see the frame format of FIG. 6) without looking at the original Ethernet frame.

Figure 5:
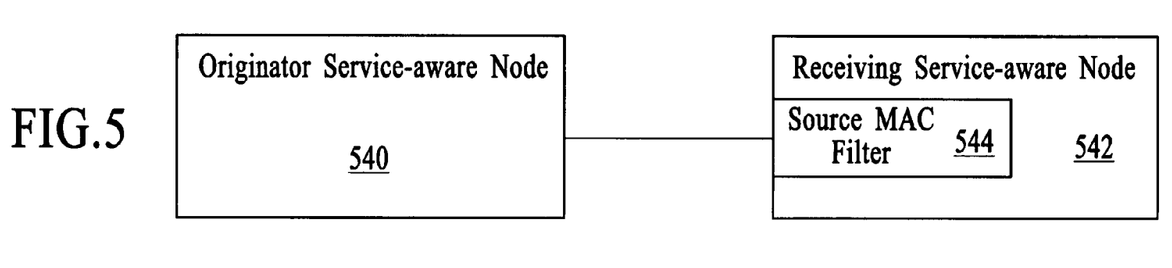
FIG. 5 depicts an originating service-aware node from which a trace-request frame is generated and a receiving service-aware node that includes a source MAC filter configured to identify trace-request frames accordance with the invention.
Figure 6:
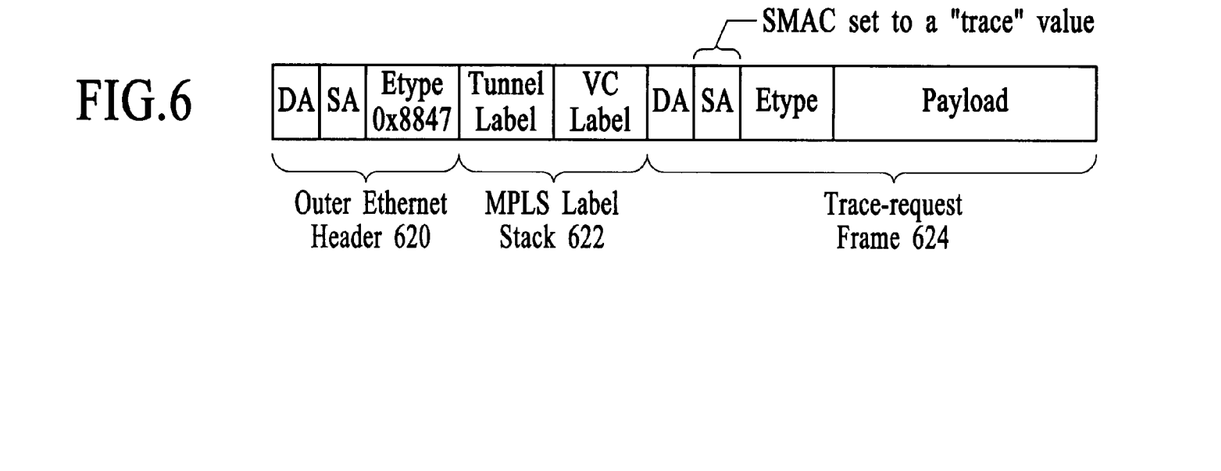
FIG. 6 depicts an example of a frame that is used in a VPLS-based network to obtain path information in accordance with the invention.

FIG. 5 depicts an originating service-aware node 540 from which a trace-request frame is generated and a receiving service-aware node 542 that includes a source MAC filter 544 configured to identify trace-request frames. In order for the source MAC filter to be able to identify a trace-request frame, the filter MAC address of the source MAC filter and the source MAC address of the trace-request frame must be coordinated. In particular, the source MAC address of the trace-request frame must be set to a value (referred to herein as a "trace" value) that is recognized by the source MAC filter. FIG. 6 depicts an example of a frame that is used in a VPLS-based network to obtain path information. The frame has a similar format to the frame in FIG. 2, including the outer Ethernet header 620 and the MPLS label stack 622. In the example of FIG. 6, the original Ethernet frame 224 is the trace-request frame 624 that is used to obtain path information. As depicted in FIG. 6, the source MAC address of the trace-request frame is set to a trace value so that the frame can be identified as a trace-request frame through source MAC filtering.

Referring back to FIG. 5, the source MAC filter 544 identifies matches between a pre-established filter MAC address and the source MAC address of incoming frames. In an embodiment, the source MAC filter is a hardware-based filter. The source MAC filter can be established with a filter MAC address that is pre-programmed to correspond with the type of interface. For example, a filter at a PE that faces an MTU (referred to herein as an "MTU-PE filter") will have a first filter MAC address, a filter at a PE that faces another PE (referred to herein as a "PE-PE filter") will have a second filter MAC address, and a filter at an MTU that faces a PE (referred to herein as a "PE-MTU filter") will have a third filter MAC address. Alternatively, the source MAC filter can be set to any filter MAC address and then learned by other service-aware nodes through a learning process. As will be described in detail below, it is necessary for the source MAC filters at different service-aware nodes to utilize different filter MAC addresses so that complete path information can be obtained.

Figure 7:
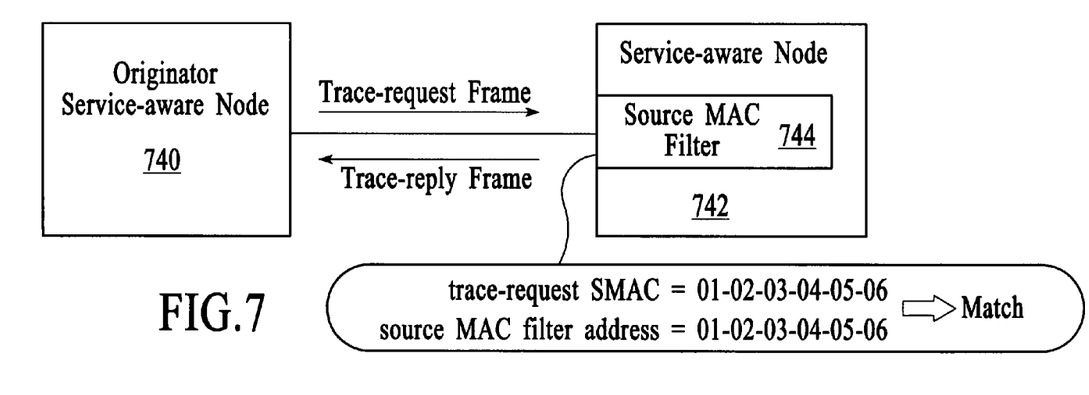
FIG. 7 depicts a technique for obtaining path information in a VPLS-based network in accordance with the invention in which there is a match between the source MAC address of the trace-request frame and the filter MAC address of the source MAC filter.

Basic operation of the technique for obtaining path information in a VPLS-based network is described with reference to FIGS. 7 and 8. With reference to FIG. 7, the originator service-aware node 740 generates a trace-request frame. The trace-request frame is then sent into the VPLS-based network using the frame format described with reference to FIG. 6. At some point, the trace-request frame encounters a service-aware node 742. At the service-aware node, the trace-request frame is filtered by the source MAC filter 744. For example purposes, it is assumed that the source MAC address of the trace-request frame (e.g., 01-02-03-04-05-06) matches the filter MAC address (e.g., 01-02-03-04-05-06) of the source MAC filter. A match at the source MAC filter triggers the generation of a trace-reply frame. In an embodiment, the match causes the trace-request frame to be pushed up to the control plane of the service-aware node and processed by a software-based operations, maintenance, and administration (OAM) task in the control plane. In response to receiving the trace-request frame, the OAM task collects path information related to the service-aware node and generates the trace-reply frame. The path information is embedded into the payload of the trace-reply frame and then the trace-reply frame is sent to the originator service-aware node through the VPLS-based network. The originator service-aware node uses the path information that is embedded into the trace-reply frame to learn the path that was traveled by the corresponding trace-request frame. Once a MAC address match is found and the trace-reply process is triggered, the trace-request frame is not forwarded again from the service-aware node.

The trace-reply frame can be sent to the originator service-aware node using different techniques. In one embodiment, the MAC address of the originator service-aware node is embedded into the payload of the trace-request frame. The MAC address is read from the payload of the trace-request frame by the OAM task and used as the destination MAC address for the trace-reply frame. In another embodiment, the destination MAC address of the trace-reply frame is set to a multicast MAC address. Using a multicast destination MAC address, the trace-reply frame is pushed to the OAM task at each service-aware node. The OAM task forwards the trace-reply frame based on the MAC address of the originator node, which is embedded into the payload of the trace-reply frame. Eventually the trace-reply frame reaches the originator service-aware node, where the trace-reply frame is recognized by the OAM task in the control plane. Alternatively, an out-of-band mechanism such as SNMP may be used to log, at the target service-aware node, that a trace-request frame was received.

Figure 8:
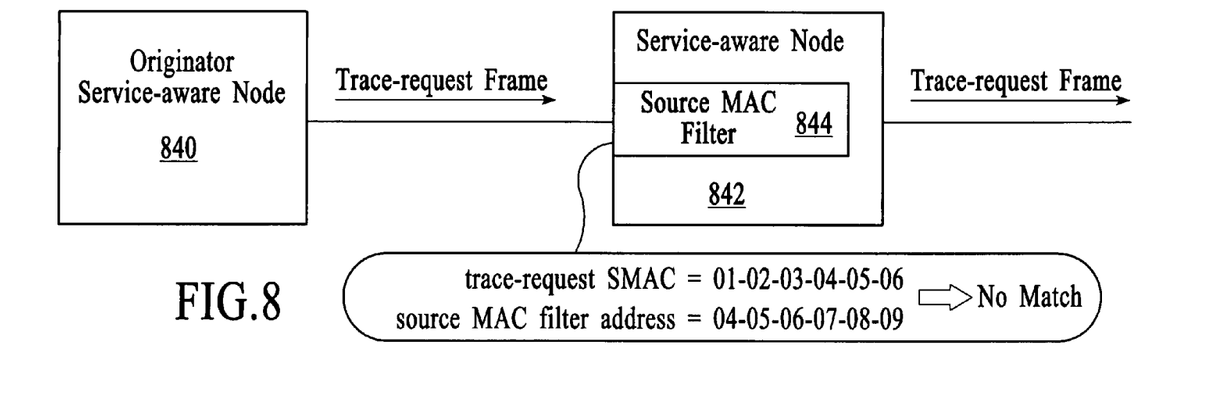
FIG. 8 depicts the case in which there is not a match between the source MAC address of the trace-request frame and the filter MAC address of the source MAC filter.

FIG. 8 depicts the case in which there is not a match between the source MAC address of the trace-request frame and the filter MAC address of the source MAC filter. In operation, the originator service-aware node 840 generates a trace-request frame that is sent into the VPLS-based network using the frame format described with reference to FIG. 6. At some point, the trace-request frame encounters a service-aware node 842. At the service-aware node, the trace-request frame is filtered by the source MAC filter 844. For example purposes, it is assumed that the source MAC address of the trace-request frame (e.g., 01-02-03-04-05-06) does not match the filter MAC address (e.g., 04-05-06-07-08-09) of the source MAC filter. Because there is not a match between the source MAC address of the trace-request frame and the filter MAC address of the source MAC filter, a trace-reply frame is not generated. Without a match at the source MAC filter, the trace-request frame is processed like any other frame (e.g., in the data plane of the service-aware node) and forwarded according to its destination MAC address. If the service-aware node encountered by the trace-request frame is a service-aware node along the path of interest, the trace-request frame is forwarded as depicted in FIG. 8 to the next service-aware node. Note that if the trace-request frame encounters intermediate nodes (i.e., non-service-aware nodes) between the originator service-aware node and any other service-aware nodes, the frame will be forwarded according to the MPLS label stack and the original Ethernet frame is not looked at.

Figure 9:
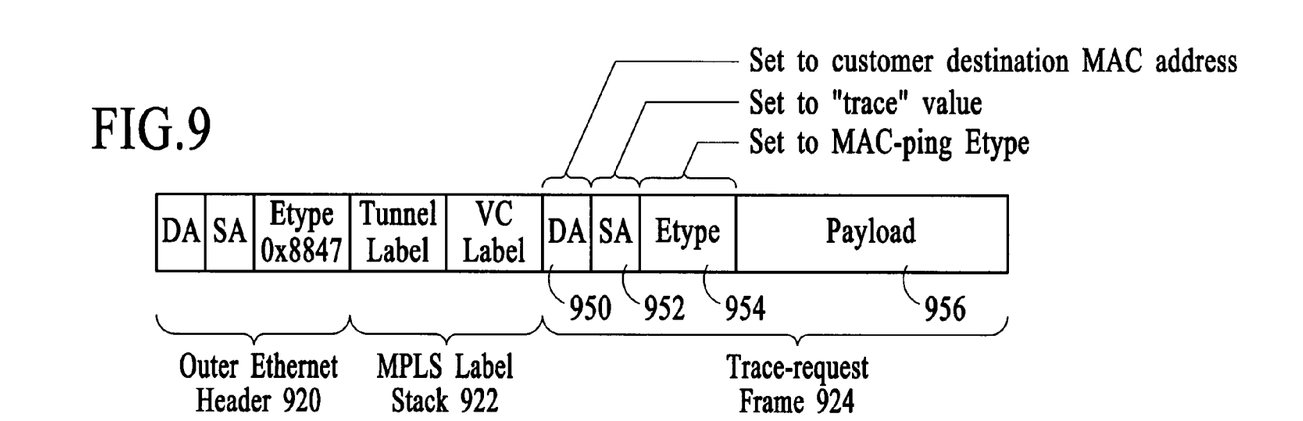
FIG. 9 depicts an example of a trace-request frame encapsulated as described with reference to FIG. 6, in which details for setting particular fields of the trace-request frame are identified.

To achieve the desired functionality, collecting path information using source MAC filtering involves setting additional fields in the trace-request frames. FIG. 9 depicts an example of a trace-request frame 924 encapsulated as described with reference to FIG. 6, in which details for setting particular fields of the trace-request frame are identified. Specifically, the destination MAC address 950 of the trace-request frame is set to a customer destination MAC address in order to make the trace-request frame follow the same path as customer traffic. The customer destination MAC address can be obtained in various ways. For example, the customer destination MAC address may be obtained manually from a network administrator, automatically through an automatic discovery process, or directly from a customer location that is having trouble reaching a certain MAC address. The source MAC address 952 of the trace-request frame is set to a trace value as described above. The Etype 954 of the trace-request frame is set to a value that causes the frame to be pushed to the control plane of the service-aware node upon being identified by the source MAC filter. For example, the Etype can be set to the Etype that is referred to as the "MAC-ping" Etype (i.e., 0x8809, subtype 08) because this Etype is recognized through standards development as an Etype that pushes a frame to the OAM task of the control plane. Although the MAC-ping Etype is described herein, a different Etype, such as a vendor-specific Etype, could be used.

Figure 10:
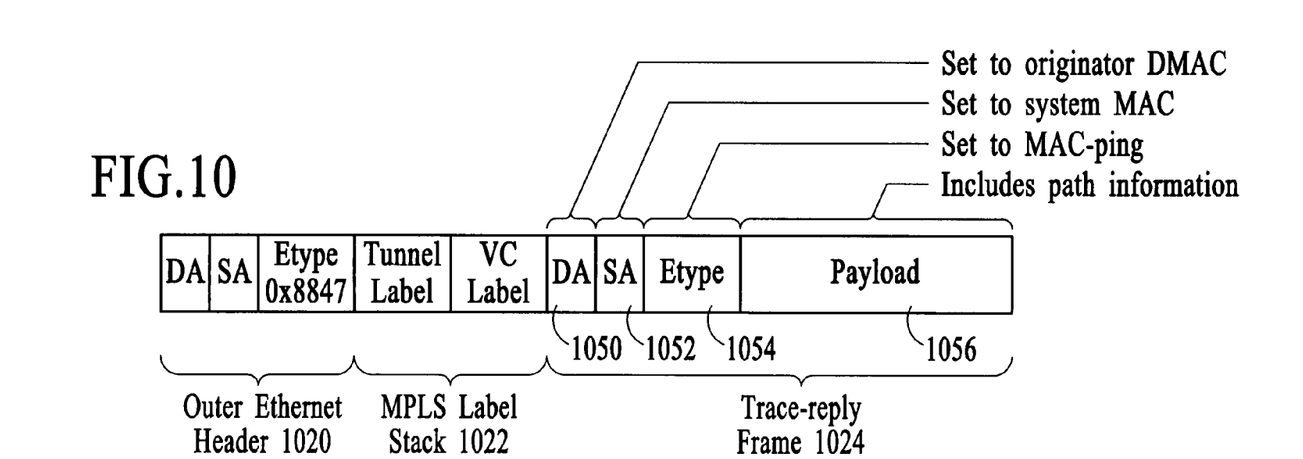
FIG. 10 depicts an example of a trace-reply frame encapsulated as described with reference to FIG. 2, in which details for setting particular fields of the trace-reply frame are identified.

As described above, a trace-reply frame is used to deliver the path information to the originator service-aware node. FIG. 10 depicts an example of a trace-reply frame 1024 encapsulated as described with reference to FIG. 2, in which details for setting particular fields of the trace-reply frame are identified. As described above, the destination MAC address 1050 of the trace-reply frame can be set to the MAC address of the originator service-aware node if the originator service-aware node's MAC address is known. Alternative techniques such as setting the destination MAC address to a multicast address can be used. The source MAC address 1052 of the trace-reply frame is set to the MAC address of the service-aware node at which the trace-reply frame is generated. The Etype 1054 of the trace-reply frame is set to the MAC-ping value so that the trace-reply frame will be pushed to the OAM task of the control plane when it reaches the originator service-aware node. The payload 1056 of the trace-reply frame includes the path information that is collected at the service-aware node where the match occurred. The path information may include, for example, the type of service-aware node (e.g., PE or MTU), the orientation of the service-aware node relative to other service-aware nodes (e.g., facing a PE or an MTU), port name, port of entry, port type, VLAN ID, type of VLAN, VLAN translation information, software versions, configuration state, VPLS customer ID on which the trace-request frame came in, filter information, and switch name.

The operation described with reference to FIGS. 7-8 involves obtaining path information from a single service-aware node. Because the path of interest in a VPLS-based network typically includes more than one service-aware node, there must be a mechanism to obtain path information from each of the service-aware nodes in the path of interest. In accordance with an embodiment of the invention, path information is obtained from each of the service-aware nodes by establishing different filter MAC addresses for the source MAC filters at each service-aware node and generating trace-request frames having source MAC addresses that correspond to the different filter MAC addresses. That is, at least one trace-request frame is generated with a source MAC address that corresponds to the filter MAC address of each one of the source MAC filters. As the trace-request frames traverse the path of interest, the trace-request frames are identified by the source MAC filters at different service-aware nodes along the path of interest and as a result, trace-reply frames are generated and sent to the originator service-aware node from the different service-aware nodes. The trace-reply frames received at the originator service aware node from the different service-aware nodes contain the path information that is used to learn the path of interest.

Although the trace-request frames have different source MAC addresses, all of the trace-request frames have the same destination MAC address. Because the destination MAC addresses of the trace-request frames are the same, each of the trace request frames follow the same path until a source MAC address match is identified. Additionally, as described above, the destination MAC addresses of the trace-request frames are set to a customer MAC address so that the path taken by the trace-request frames mimics the path that is taken by customer traffic. Further, trace-request frames that are not pushed to the OAM task in the control plane as a result of source MAC filtering are processed in the data plane of the service-aware nodes the same as regular customer traffic.

Figure 11:
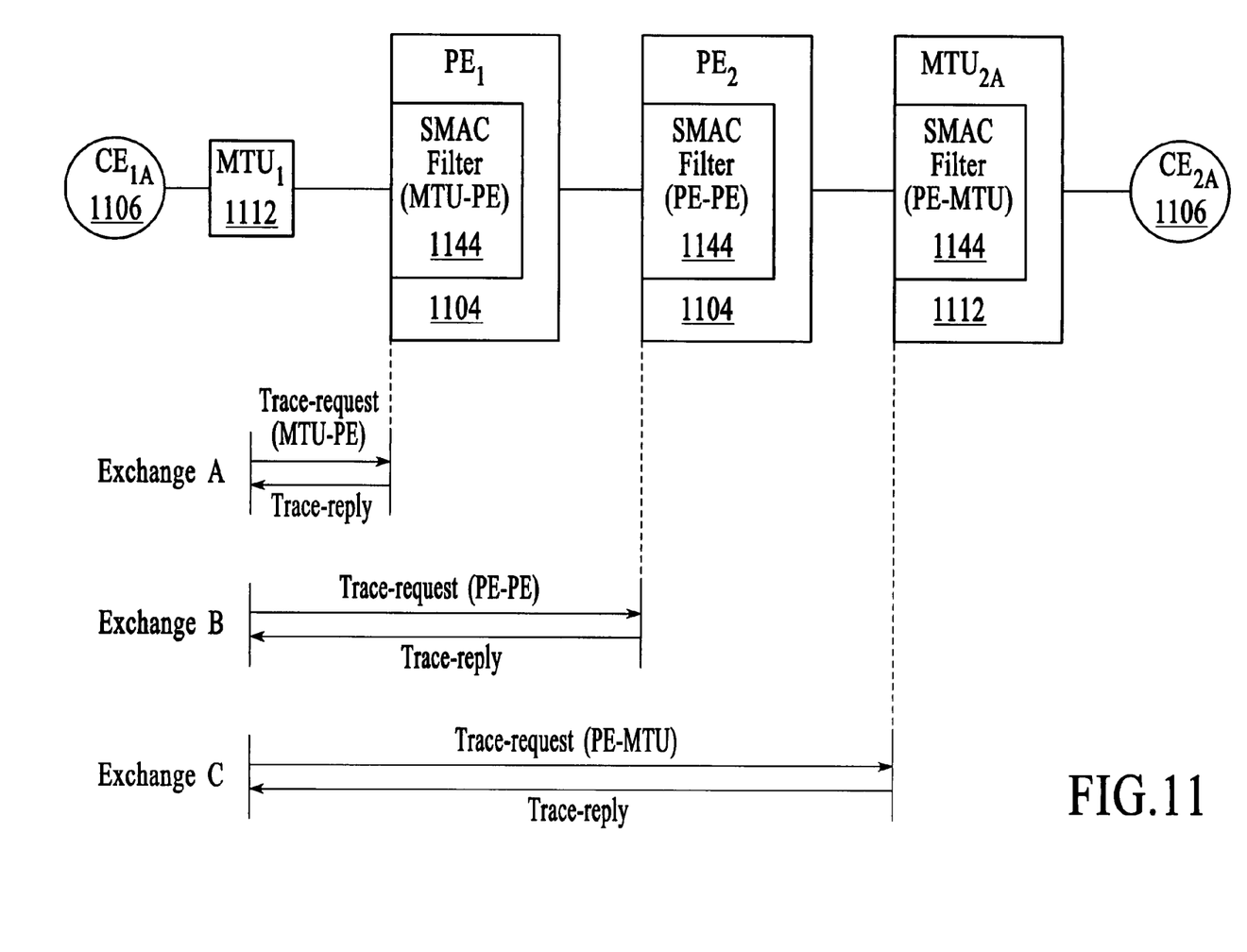
FIG. 11 depicts an example process for obtaining path information for a path of interest in a VPLS-based network in accordance with the invention.

The process of obtaining path information for a path of interest in a VPLS-based network is described in more detail with reference to FIG. 11. Firstly, FIG. 11 depicts the service-aware nodes 1104 and 1112 in a VPLS-based network along the path of interest between two CEs 1106 (e.g., between $CE_{1A}$ and $CE_{2A}$). The service-aware nodes are the same nodes that are depicted in the HVPL-based architecture of FIG. 4. Source MAC filters 1144 are also depicted within some of the service-aware nodes. The filter MAC addresses of the source MAC filters are set to correspond to the type of service-aware node and the location of the service-aware node relative to the other service-aware nodes. For example, the $PE_1$ interface that faces $MTU_1$ is configured with an MTU-PE filter, the $PE_2$ interface that faces $PE_1$ is configured with a PE-PE filter, and the $MTU_{2A}$ interface that faces $PE_2$ is configured with a PE-MTU filter, where the MTU-PE, PE-PE, and PE-MTU filters are configured with different filter MAC addresses.

Secondly, FIG. 11 depicts the exchange of trace-request and trace-reply frames relative to the service-aware nodes that is involved in obtaining path information related to the path of interest in the VPLS-based network. In operation, a first trace-request frame having a source MAC address that matches the MTU-PE filter is generated by $MTU_1$ and sent into the VPLS-based network (see exchange A). As the trace-request frame traverses the path of interest in the VPLS-based network, the trace-request frame first encounters $PE_1$. $PE_1$ applies its source MAC filter to the trace-request frame and finds a source MAC match. The source MAC match triggers the collection of path information and the generation of a trace-reply frame. The path information is embedded into the payload of the trace-reply frame and the trace-reply frame is sent to $MTU_1$ (i.e., the originator service-aware node).

In parallel with the process of exchange A, a second trace-request frame having a source MAC address that matches the PE-PE filter is generated by $MTU_1$ and sent into the VPLS-based network (see exchange B). As the trace-request frame traverses the path of interest, the trace-request frame first encounters $PE_1$. $PE_1$ applies its source MAC filter to the frame but no match is found. The trace-request frame is processed by $PE_1$ as any other frame and forwarded along the VPLS-based network according to its destination MAC address. The trace-request frame next encounters $PE_2$. $PE_2$ applies its source MAC filter to the frame and finds a match. The source MAC match triggers the collection of path information and the generation of a trace-reply frame. The path information is embedded into the payload of the trace-reply frame and the trace-reply frame is sent to $MTU_1$ (i.e., the originator service-aware node).

In parallel with the processes of exchanges A and B, a third trace-request frame having a source MAC address that matches the PE-MTU filter is generated by $MTU_1$ and sent into the VPLS-based network (see exchange C). As the trace-request frame traverses the path of interest, the trace-request frame encounters $PE_1$ and $PE_2$. $PE_1$ and $PE_2$ both apply their source MAC filter to the trace-request frame but no match is found. The trace-request frame is processed as any other frame and forwarded by $PE_1$ and then by $PE_2$ along the VPLS-based network according to the frame's destination MAC address. The trace-request frame next encounters $MTU_{2A}$. $MTU_{2A}$ applies its source MAC filter to the frame and finds a match. The source MAC match triggers the collection of path information and the generation of a trace-reply frame. The path information is embedded into the payload of the trace-reply frame and the trace-reply frame is sent to $MTU_1$ (i.e., the originator service-aware node).

As a result of exchanges A, B, and C, three trace-reply frames are received at $MTU_1$ (i.e., the originator service-aware node). The three trace-reply frames carry path information, which includes, for example, the type of service-aware node (e.g., PE or MTU), the orientation of the service-aware node relative to other service-aware nodes (e.g., facing a PE or an MTU), port name, port of entry, port type, VLAN ID, type of VLAN, VLAN translation information, software versions, configuration state, VPLS customer ID on which the trace-request frame came in, filter information, and switch name. The originator service-aware node combines all of the path information to learn the path of interest. Because the trace-request frames use a customer destination MAC address, the path taken by the trace-request frames mimics the path that is taken by customer traffic. In this way, the above-described technique provides an accurate characterization of the data plane configuration of the service-aware nodes.

Figure 12:
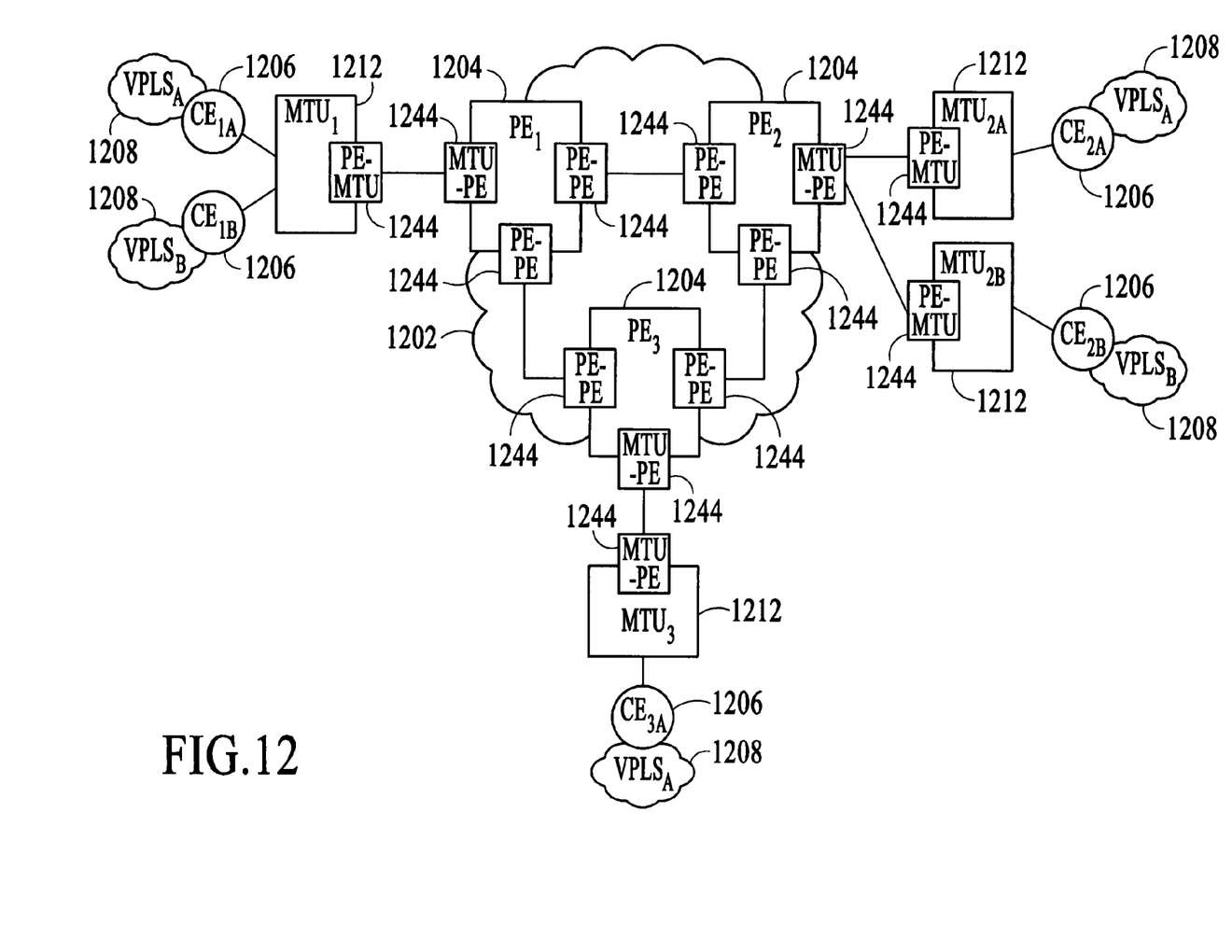
FIG. 12 depicts the HVPLS-based network architecture of FIG. 3 configured with source MAC filters in accordance with the invention.

In order to implement the above-described technique on a network-wide basis over a VPLS or HVPLS-based network, source MAC filters must be configured at the VPLS interfaces of the service-aware nodes. FIG. 12 depicts the HVPLS-based network architecture of FIG. 3, including the location and type of source MAC filters 1244 that can be installed to collect path information as described above. In the example of FIG. 1, $MTU_1$ has a PE-MTU filter that faces $PE_1$. $PE_2$ has an MTU-PE filter that faces $MTU_1$, a PE-PE filter that faces $PE_2$, and a PE-PE filter that faces $PE_3$. $MTU_{2A}$, $MTU_{2B}$, and $MTU_3$ are configured similar to $MTU_1$ while $PE_2$ and $PE_3$ are configured similar to $PE_1$. In operation, the path between any two CEs can be determined by sending trace-request frames into the VPLS-based network from the nearest MTU. For example, the path of interest between $CE_{1A}$ and $CE_3$ can be determined by sending trace-request frames from $MTU_1$ into the VPLS-based network. Because the destination MAC address of the trace-request frames is set to the desired customer MAC address, the trace-request frames will traverse the VPLS-based network over the same path as customer packets until the trace-request frames encounter a matching source MAC filter. Once a matching source MAC filter is encountered, the trace-reply process is triggered.

Figure 13:
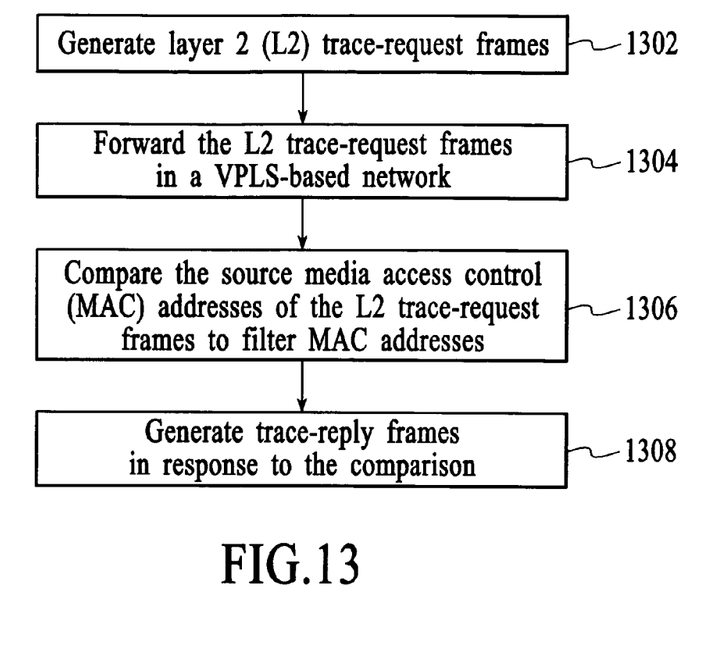
FIG. 13 is a process flow diagram of a method for obtaining path information related to a VPLS-based network in accordance with the invention.

FIG. 13 is a process flow diagram of a method for obtaining path information related to a VPLS-based network. At step 1302, L2 trace-request frames are generated. At step 1304, the L2 trace-request frames are forwarded in a VPLS-based network. At step 1306, the source MAC addresses of the L2 trace-request frames are compared to filter MAC addresses. At step 1306, trace-reply frames are generated in response to the comparison.

Figure 14:
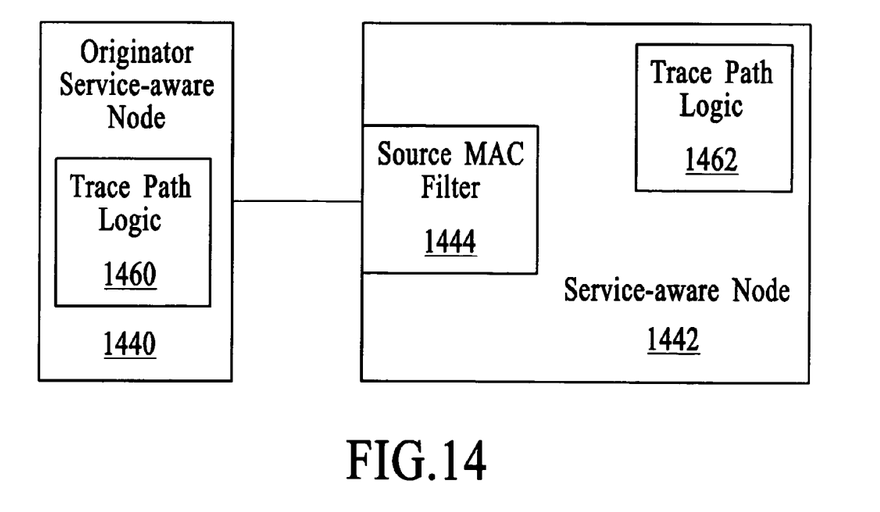
FIG. 14 is a functional block diagram that depicts trace path logic that exists within the originator service-aware node and one of the other service-aware nodes in a VPLS-based network.

FIG. 14 is a functional block diagram that depicts trace path logic 1460 and 1462 that exists within the originator service-aware node 1440 and one of the other service-aware nodes 1442 in a VPLS-based network. The trace path logic at the service-aware nodes is configured to support the functionality described above with reference to FIGS. 4-13. Specifically, the trace path logic 1460 at the originator service-aware node supports the generation of the trace-request frames as described above. The trace path logic 1462 at the other service-aware node supports the collection of path information and the generation of the trace-reply frames as described above. The source MAC filter 1444 performs source MAC filtering of the incoming L2 frames as described above. Typically, the trace path logic is embodied in software, although it can be embodied in hardware, firmware, or any combination of software, hardware, and firmware.

The trace path functionality can be initiated at any service-aware node using remote network management techniques. For example, the trace-path functionality can be initiated using a command line interface (CLI) or SNMP.

While the source MAC address of an L2 frame is typically used to identify the source of the frame for source MAC learning, as described above, the source MAC is set to an artificial value that is used to identify the frame as a trace-request frame. Setting the source MAC address of trace-request frames to an artificial value provides an efficient mechanism by which to identify trace-request frames.

Throughout the description, a VPLS-based network includes an HVPLS-based network architecture.

If the source MAC filters are not configured with pre-established filter MAC addresses that are known by the other service-aware nodes in the VPLS-based network, the filter MAC addresses of the source MAC filters must be discovered before the trace-request frames are sent into the network. Discovering the filter MAC addresses of the source MAC filters can be accomplished using different techniques. Once technique involves sending probe frames in the VPLS-based network to collect filter MAC address information. The filter MAC information can be collected and transported in designated type, length, value (TLV) fields of OAM frames. The particular technique for collecting the filter MAC address information is not critical to the invention.

The technique for obtaining path information described above can be implemented in a network environment other than VPLS. For example, the path collection technique can be implemented in other tunnel-capable networks that utilize, for example, GRE, L2TP, or IPSEC.

As used herein, network "Layers" are defined by the Open System Interconnection (OSI) model as published by the International Standardization Organization (ISO).

Although specific embodiments of the invention have been described and illustrated, the invention is not to be limited to the specific forms or arrangements of parts as described and illustrated herein. The invention is limited only by the claims.

What is claimed is:

1. A method for obtaining path information related to a virtual private local area network services (VPLS) based network comprising:
   generating layer 2 (L2) trace-request frames;
   setting the source media access control (MAC) addresses of the L2 trace-request frames to trace values;
   forwarding the L2 trace-request frames in a VPLS-based network, wherein the forwarding defines a traversed path;
   comparing the source MAC addresses of the L2 trace-request frames to filter MAC addresses;
   generating trace-reply frames in response to the comparing of the source MAC addresses of the L2 trace-request frames to the filter MAC addresses, wherein the trace-reply frames are generated in response to matches between the source MAC addresses and the filter MAC addresses;
   collecting path information that identifies the traversed paths of the L2 trace-request frames and embedding the path information into a payload portion of the trace-reply frames; and
   forwarding the trace-reply frames in the VPLS-based network, wherein the path information embedded in the payload portion of the trace-reply frames is used to learn the traversed paths of the corresponding L2 trace-request frames;
   wherein the trace values are values that enable L2 frames to be identified as trace-request frames through the comparisons of the source MAC addresses to the filter MAC addresses.

2. The method of claim 1 including setting the source MAC addresses of the L2 trace-request frames to match filter MAC addresses.

3. The method of claim 1 wherein the trace-request frame includes an originator MAC address in the payload and further including forwarding the trace-reply frames using the originator MAC address.

4. The method of claim 1 including setting the destination MAC addresses of the L2 trace-request frames to a customer MAC address.

5. The method of claim 4 including forwarding the L2 trace-request frames within the VPLS-based network based on the customer MAC address.

6. The method of claim 1 including setting the destination MAC addresses of the L2 frames to a customer destination MAC address so that the L2 trace-request frames traverse the same path as a customer frame.

7. The method of claim 6 including forwarding the L2 trace-request frames within the VPLS-based network based on the customer MAC address.

8. The method of claim 1 including establishing source MAC filters at service-aware nodes of the VPLS-based network.

9. The method of claim 1 including establishing a source MAC filter at a provider edge device (PE) on an interface that faces a multi-tenant unit device (MTU), the source MAC filter being referred to as an MTU-PE filter.

10. The method of claim 1 including establishing a source MAC filter at a provider edge device (PE) on an interface that faces a PE, the source MAC filter being referred to as a PE-PE filter.

11. The method of claim 1 including establishing a source MAC filter at a multi-tenant unit device (MTU) on an interface that faces a provider edge device (PE), the source MAC filter being referred to as an PE-MTU filter.

12. The method of claim 1 including establishing:
a source MAC filter at a provider edge device (PE) on an interface that faces a multi-tenant unit device (MTU), the source MAC filter being referred to as an MTU-PE filter;
a source MAC filter at a PE on an interface that faces a PE, the source MAC filter being referred to as a PE-PE filter; and
a source MAC filter at an MTU on an interface that faces a PE, the source MAC filter being referred to as an PE-MTU filter.

13. The method of claim 1 wherein a match between the source MAC address of an L2 trace-request frame and the filter MAC address triggers the L2 trace-request frame to be pushed up to a control plane of a service-aware node of the VPLS-based network and processed by the operation, maintenance, and control (OAM) task.

14. The method of claim 1 wherein the L2 trace-request frame includes an Etype field that is set to a value that causes the L2 trace-request frame to be pushed to a control plane of a service-aware node upon being identified as an L2 trace-request frame through the source MAC address and filter MAC address comparison.

15. The method of claim 1 further comprising establishing different filter MAC addresses for different service-aware nodes in the VPLS-based network and generating different L2 trace-request frames that have source MAC addresses that correspond to the different filter MAC addresses, such that path information can be obtained from each of the different service-aware nodes in a path of interest.

16. The method of claim 15 wherein the destination MAC addresses of the L2 trace-request frames have the same destination MAC addresses so that each of the L2 trace-request frames follows the same path until a source MAC address match is identified.

17. A system for obtaining path information related to a virtual private local area network services (VPLS) based network comprising:
means for:
generating layer 2 (L2) trace-request frames;
setting the source media access control (MAC) addresses of the L2 trace-request frames to trace values;
forwarding the L2 trace-request frames in a VPLS-based network, wherein the forwarding defines a traversed path;
comparing the source MAC addresses of the L2 trace-request frames to filter MAC addresses;
generating trace-reply frames in response to the comparing of the source MAC addresses of the L2 trace-request frames to the filter MAC addresses, wherein the trace-reply frames are generated in response to matches between the source MAC addresses and the filter MAC addresses;
collecting path information that identifies the traversed paths of the L2 trace-request frames and embedding the path information into a payload portion of the trace-reply frames; and
forwarding the trace-reply frames in the VPLS-based network;
wherein the trace values are values that enable L2 frames to be identified as trace-request frames through the comparisons of the source MAC addresses to the filter MAC addresses.

18. The system of claim 17 including means for setting the source MAC addresses of the L2 trace-request frames to match filter MAC addresses.

19. The system of claim 17 wherein the trace-request frame includes an originator MAC address in the payload and including means for forwarding the trace-reply frames using the originator MAC address.

20. The system of claim 17 including means for setting the destination MAC addresses of the L2 trace-request frames to a customer MAC address.

21. The system of claim 20 including means for forwarding the L2 trace-request frames within the VPLS-based network based on the customer MAC address.

22. The system of claim 17 including means for setting the destination MAC addresses of the L2 frames to a customer destination MAC address so that the L2 trace-request frames traverse the same path as a customer frame.

23. The system of claim 22 including means for forwarding the L2 trace-request frames within the VPLS-based network based on the customer MAC address.

24. The system of claim 17 including source MAC filters at service-aware nodes of the VPLS-based network.

25. The system of claim 17 including:
a source MAC filter at a provider edge device (PE) on an interface that faces a multi-tenant unit device (MTU), the source MAC filter being referred to as an MTU-PE filter;
a source MAC filter at a PE on an interface that faces a PE, the source MAC filter being referred to as a PE-PE filter; and
a source MAC filter at an MTU on an interface that faces a PE, the source MAC filter being referred to as an PE-MTU filter.

26. The system of claim 17 wherein a match between the source MAC address of an L2 trace-request frame and the filter MAC address triggers the L2 trace-request frame to be pushed up to a control plane of a service-aware node of the VPLS-based network and processed by the operation, maintenance, and control (OAM) task.

27. The system of claim 17 wherein the L2 trace-request frame includes an Etype field that is set to a value that causes the L2 trace-request frame to be pushed to a control plane of a service-aware node upon being identified as an L2 trace-request frame through the source MAC address and filter MAC address comparison.

28. The system of claim 17 further comprising means for establishing different filter MAC addresses for different service-aware nodes in the VPLS-based network and generating different L2 trace-request frames that have source MAC addresses that correspond to the different filter MAC addresses, such that path information can be obtained from each of the different service-aware nodes in a path of interest.

29. The system of claim 28 wherein the destination MAC addresses of the L2 trace-request frames have the same destination MAC addresses so that each of the L2 trace-request frames follows the same path until a source MAC address match is identified.

* * * * *